(12) United States Patent
Su et al.

(10) Patent No.: US 11,834,131 B1
(45) Date of Patent: Dec. 5, 2023

(54) REAR DERAILLEUR

(71) Applicant: AD-II Engineering Inc., Taichung (TW)

(72) Inventors: Chien-Hao Su, Taichung (TW); Yu-Hsuan Cheng, Taichung (TW); Kai-Hung Hu, Taichung (TW)

(73) Assignee: AD-II ENGINEERING INC., Taichung (TW)

( * ) Notice: Subject to any disclaimer, the term of this patent is extended or adjusted under 35 U.S.C. 154(b) by 37 days.

(21) Appl. No.: 17/839,942

(22) Filed: Jun. 14, 2022

(51) Int. Cl.
*B62M 9/1248* (2010.01)
*B62M 9/126* (2010.01)
*B62M 9/1242* (2010.01)

(52) U.S. Cl.
CPC .......... *B62M 9/1248* (2013.01); *B62M 9/126* (2013.01); *B62M 9/1242* (2013.01)

(58) Field of Classification Search
CPC ... B62M 9/1248; B62M 9/1242; B62M 9/126
USPC .......................................................... 474/80
See application file for complete search history.

(56) References Cited

U.S. PATENT DOCUMENTS

2022/0144380 A1* 5/2022 Hu ........................... B62M 9/16
2022/0177076 A1* 6/2022 Peruzzo ............... B62M 9/1248

FOREIGN PATENT DOCUMENTS

| CN | 107434007 A | * | 12/2017 | .............. B62M 9/12 |
| EP | 3772453 A1 | * | 2/2021 | ............ B62M 9/121 |
| TW | I580610 B | | 5/2017 | |

* cited by examiner

*Primary Examiner* — Gene O Crawford
*Assistant Examiner* — Emily R Kincaid
(74) *Attorney, Agent, or Firm* — MUNCY, GEISSLER, OLDS & LOWE, P.C.

(57) ABSTRACT

A rear derailleur is provided, including: a base, configured to be mounted to a bicycle; a linkage assembly, connected to the base; a movable member, rotatably connected to the linkage assembly; a chain guide, rotatably connected to the movable member by an axle assembly; a biasing member, located between the movable member and the chain guide, positioned to the movable member and the chain guide; a resistance mechanism, connected to the movable member; and a cap member, covering the resistance mechanism and driving the resistance mechanism, rotatably positionable in either of a first position and a second position, wherein when the cap member is positioned in the first position, the resistance mechanism provides a first resistance, and when the cap member is positioned in the second position, the resistance mechanism provides a second resistance which is different from the first resistance.

10 Claims, 7 Drawing Sheets

REAR DERAILLEUR

BACKGROUND OF THE INVENTION

Field of the Invention

The present invention relates to a rear derailleur.

Description of the Prior Art

The transmission system of bicycle is designed to be capable of being shifted with many speeds to respond to various operation conditions and road surfaces. A conventional transmission system includes a chain, flywheel, derailleur and associated control devices. The derailleurs can be classified into front derailleurs and rear derailleurs. The front derailleur is mounted to the sprocket, and the rear derailleur is mounted to the flywheel, such as that disclosed in TW 1580610.

In TW 1580610, the pivot shaft and the external members are formed to be an integral unit, the control cam and the adjusting cam can be driven by the control lever to jointly clamp against the friction applying member, so that the friction applying member applies a frictional resistance to the external member, thereby making the pivot shaft not easy to rotate, which ensures that the chain guide is not easy to act arbitrarily.

However, the friction applying member is prone to elasticity fatigue and deformation and fracture due to long-term use, and cannot effectively provide frictional resistance to the external member, resulting in reduced efficacy or even malfunction. Moreover, the control lever is prone to arbitrary swing and fractures due to unexpected collisions. This is not conducive to the stability of the mechanism and the structural durability. Furthermore, the control lever is also prone to accumulation of dirt, and it is difficult to clean.

The present invention is, therefore, arisen to obviate or at least mitigate the above-mentioned disadvantages.

SUMMARY OF THE INVENTION

The main object of the present invention is to provide a rear derailleur which has good stability and reliability during use, has the advantages of convenient and intuitive operation, and is easy to clean and maintain.

To achieve the above and other objects, a rear derailleur is provided, including: a base, configured to be mounted to a bicycle; a linkage assembly, connected to the base; a movable member, rotatably connected to the linkage assembly; a chain guide, rotatably connected to the movable member by an axle assembly; a biasing member, located between the movable member and the chain guide, positioned to the movable member and the chain guide; a resistance mechanism, connected to the movable member; and a cap member, covering the resistance mechanism and driving the resistance mechanism, rotatably positionable in either of a first position and a second position, wherein when the cap member is positioned in the first position, the resistance mechanism provides a first resistance, and when the cap member is positioned in the second position, the resistance mechanism provides a second resistance which is different from the first resistance.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
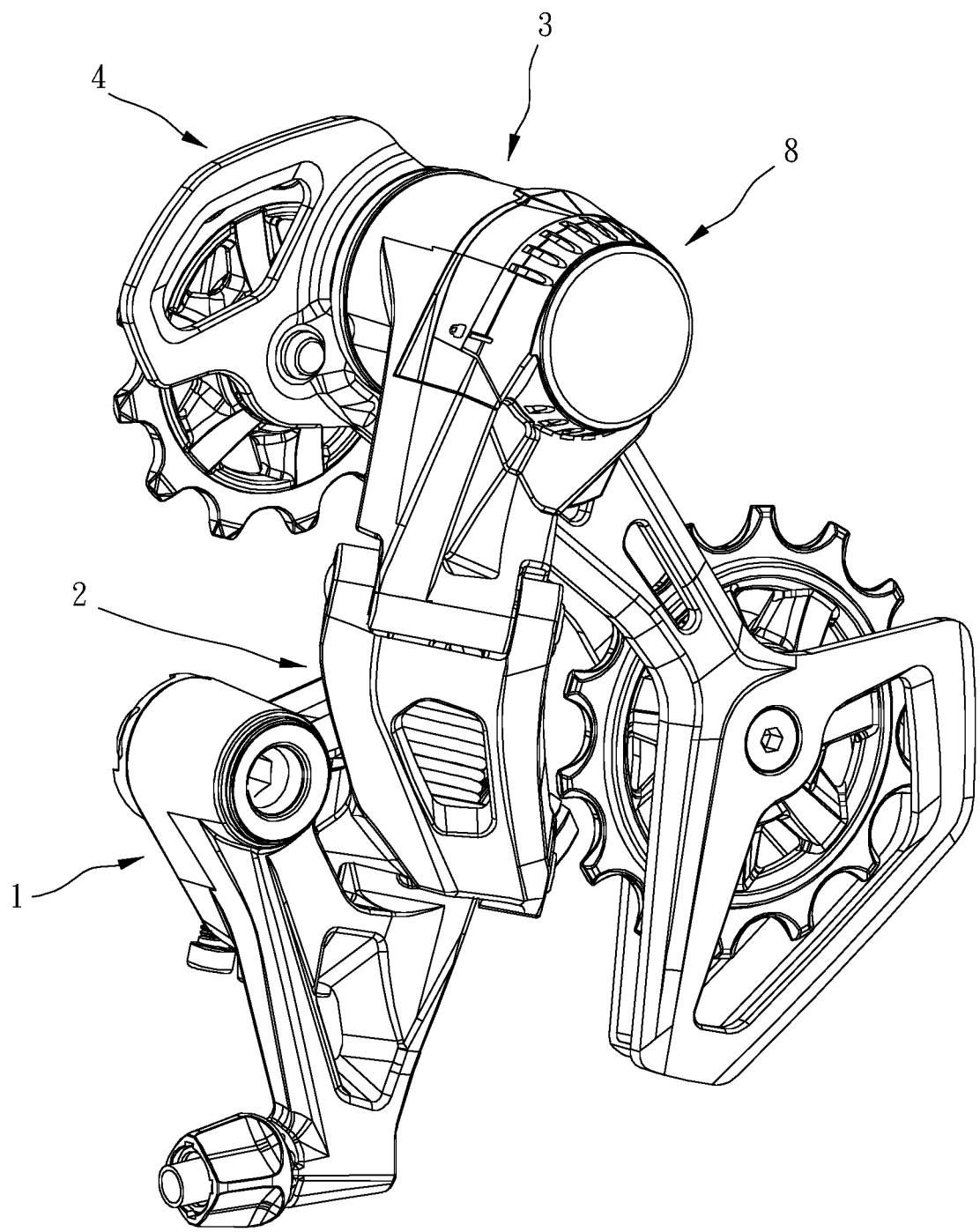
FIG. 1 is a stereogram of a preferable embodiment of the present invention.
Figure 2:
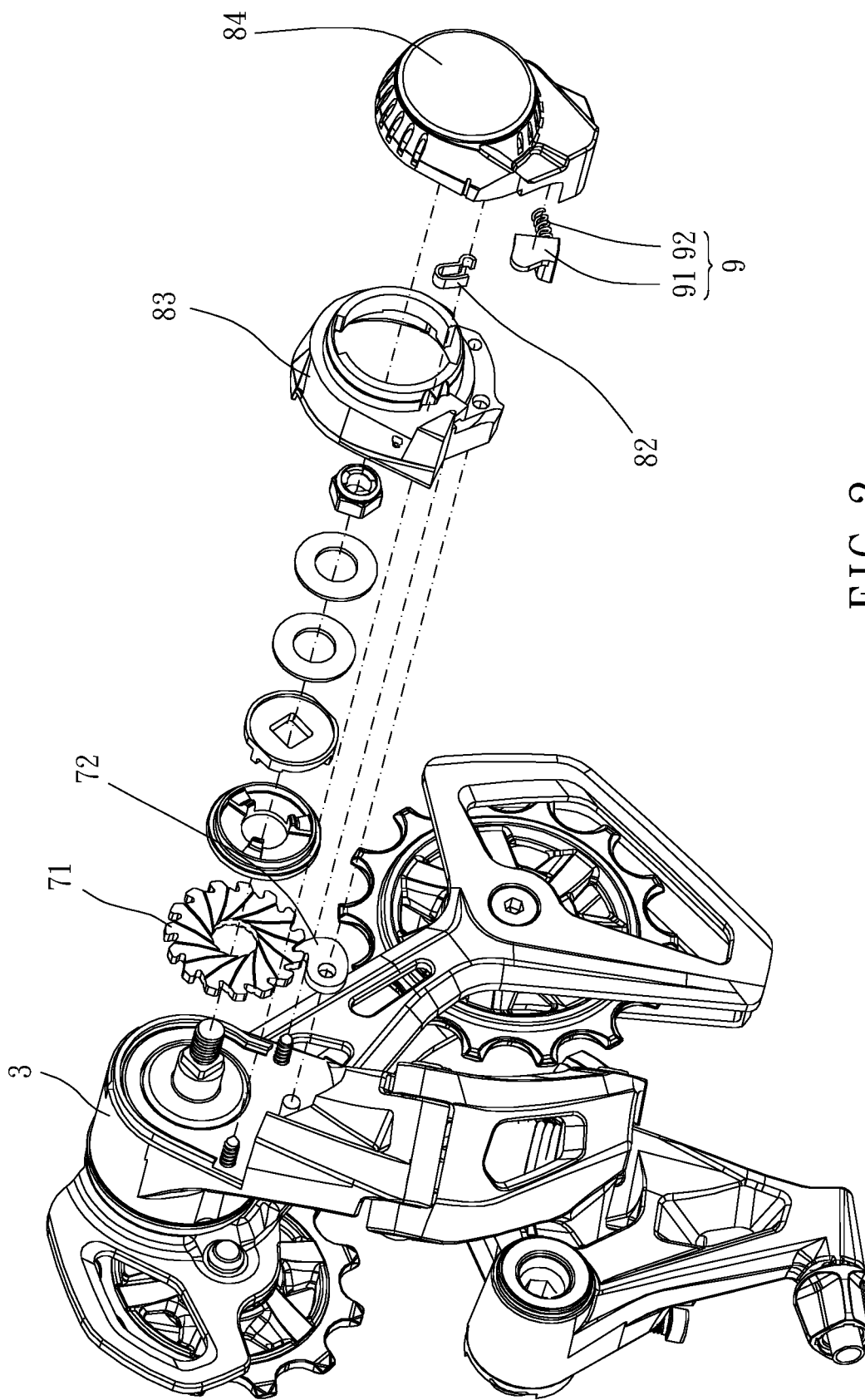
FIG. 2 is a first breakdown drawing of a preferable embodiment of the present invention.
Figure 3:
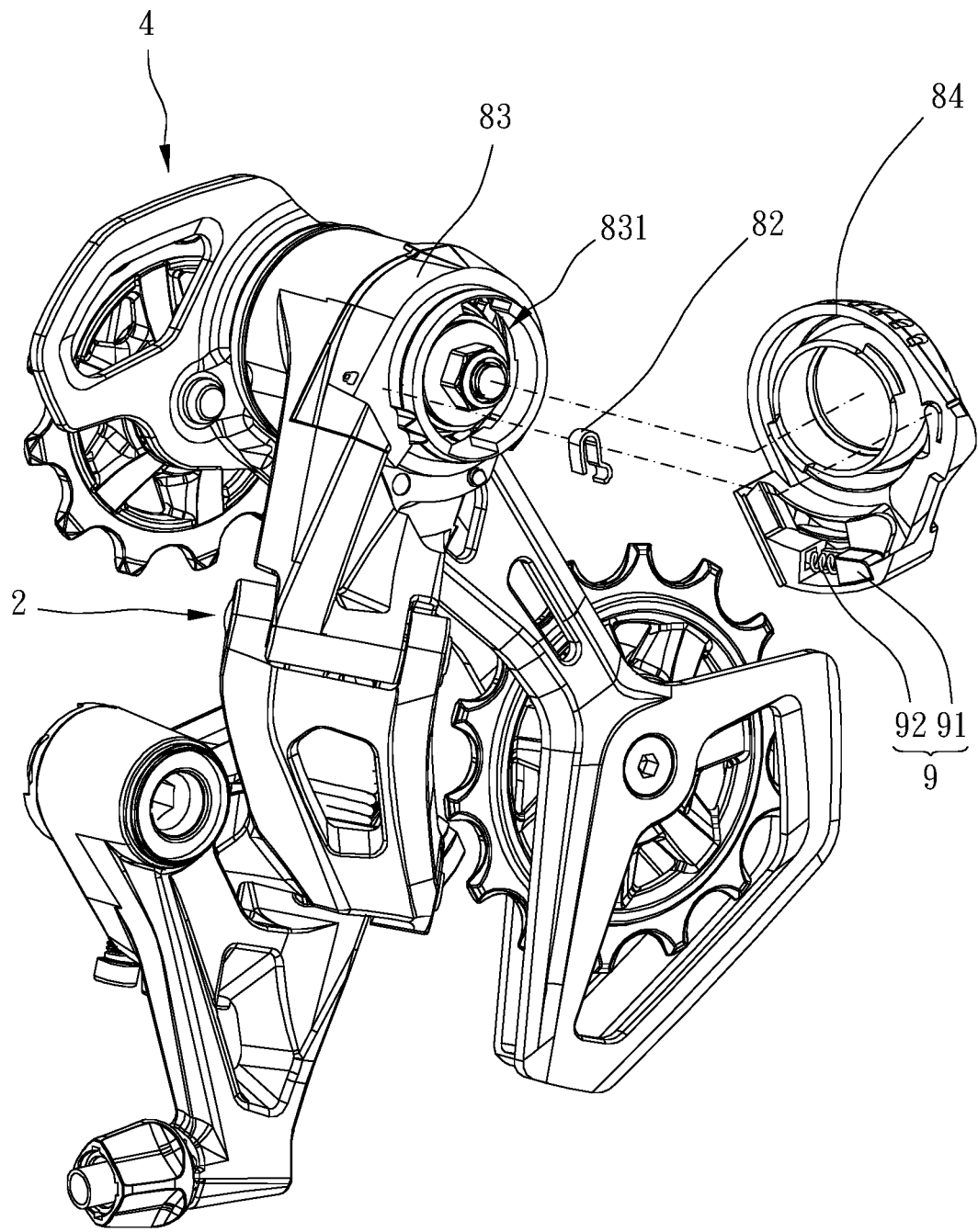
FIG. 3 is a second breakdown drawing of a preferable embodiment of the present invention.
Figure 4:
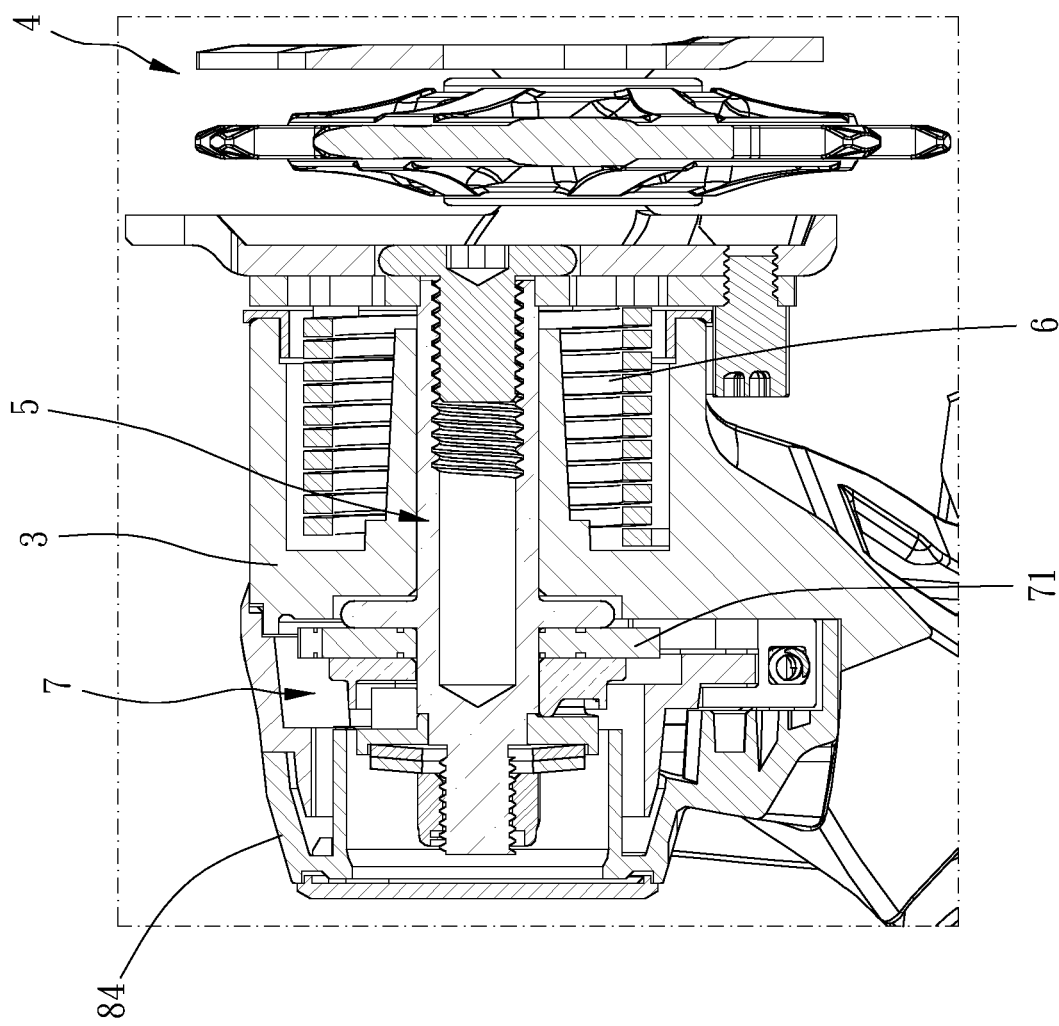
FIG. 4 is a partial cross-sectional of FIG. 1.
Figure 5:
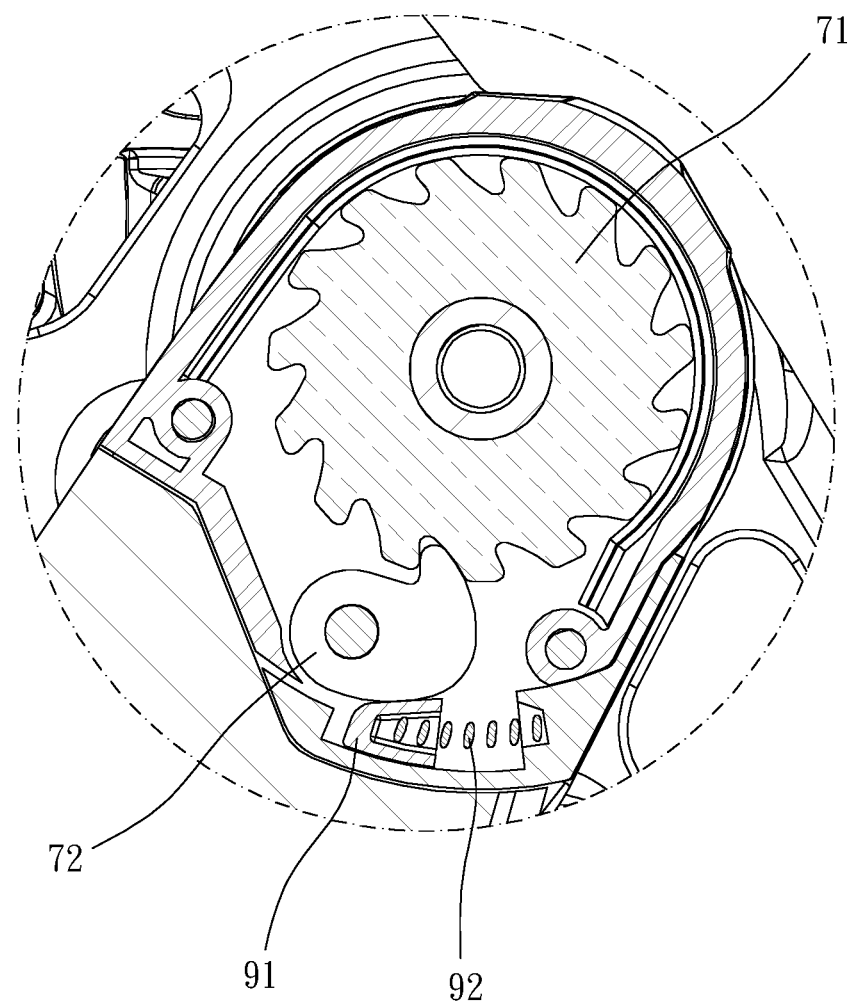
FIG. 5 is a drawing showing a pawl and a ratchet member engaged with each other according to a preferable embodiment of the present invention.
Figure 6:
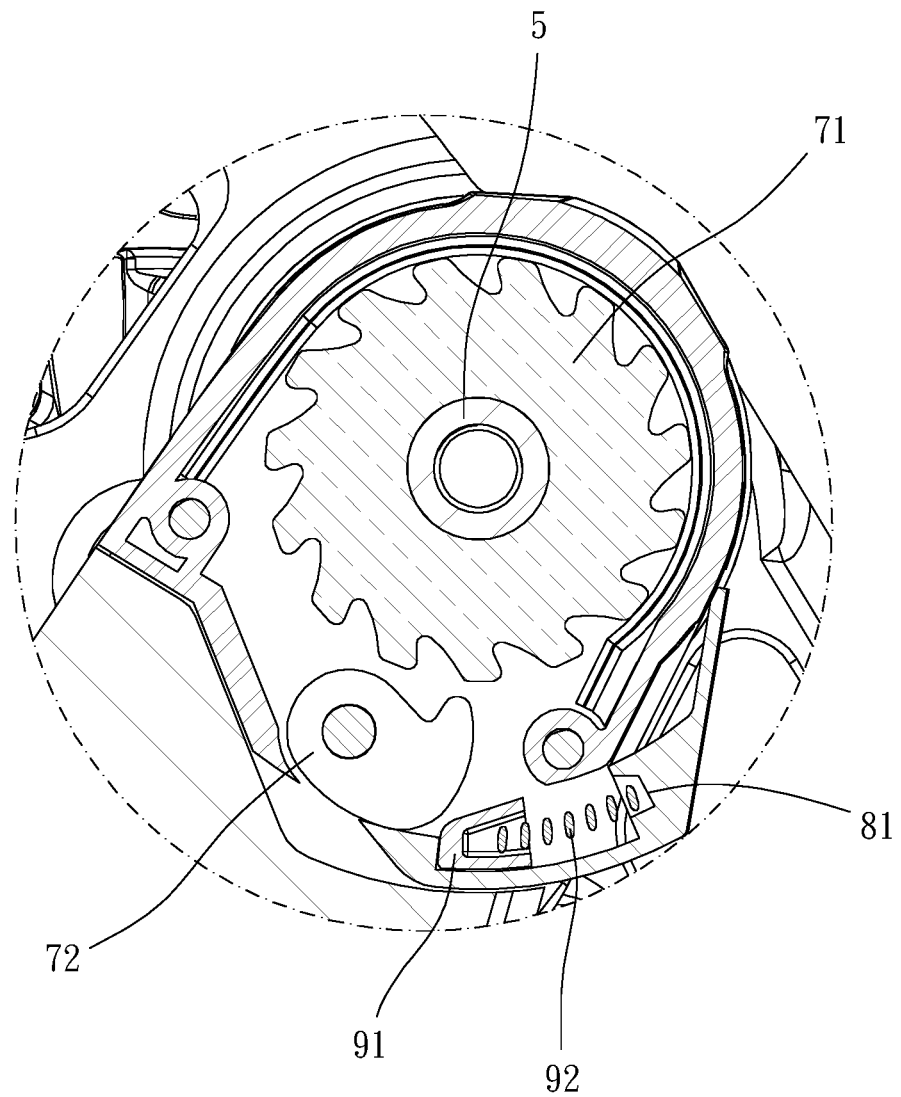
FIG. 6 is a drawing showing the pawl and the ratchet member disengaged from each other according to a preferable embodiment of the present invention.
Figure 7:
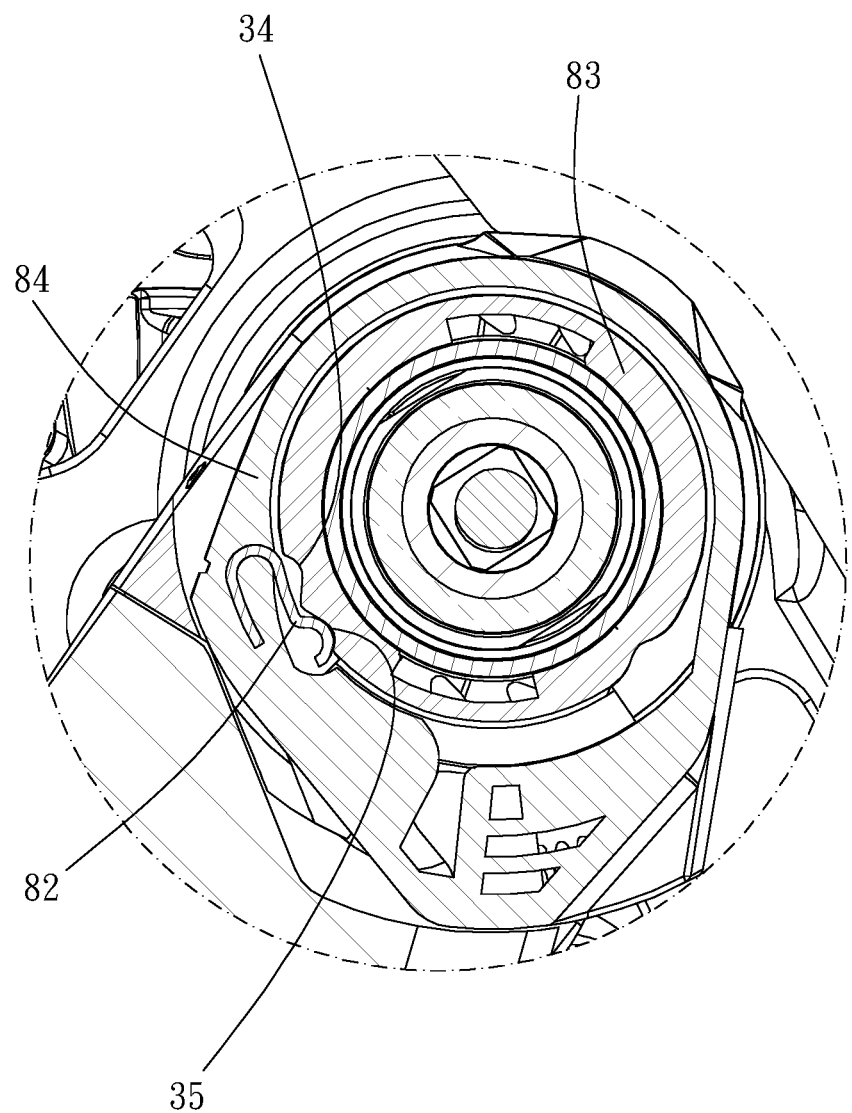
FIG. 7 is a drawing showing a cap member of a preferable embodiment of the present invention.

Please refer to FIGS. 1 to 7 for a preferable embodiment of the present invention. A rear derailleur of the present invention includes a base 1, a linkage assembly 2, a movable member 3, a chain guide 4, a biasing member 6, a resistance mechanism 7 and a cap member 8.

The base 1 is configured to be mounted to a bicycle. The linkage assembly 2 is connected to the base 1. The movable member 3 is rotatably connected to the linkage assembly 2, which allows the adjustment of the movable member 3 relative to the base 1. The chain guide 4 is rotatably connected to the movable member 3 by an axle assembly 5 so that the chain guide 4 is rotatable with the axle assembly 5.

The biasing member 6 is located between the movable member 3 and the chain guide 4, one end of the biasing member 6 is positioned to the movable member 3, and another end of the biasing member 6 is positioned to the chain guide 4, so that the chain guide 4 is pre-biased and not freely rotatable. The resistance mechanism 7 is connected to the movable member 3 and provides additional resistance to the axle assembly 5, which provides selectively different rotary resistances to the chain guide 4. In this embodiment, the resistance mechanism 7 is disposed around the axle assembly 5.

The cap member 8 covers the resistance mechanism 7 and drives the resistance mechanism 7, and the cap member 8 is rotatable relative to the movable member 3. In other words, the cap member 8 is movable with the resistance mechanism 7, and the rider can simply rotate the cap member 8 to drive the resistance mechanism 7. The operation is quite convenient and intuitive, and the overall mechanism has the advantages of requiring less components and simple structure. In addition, when colliding, two objects that collide with each other mostly move linearly, while the actuation of the cap member 8 requires rotation of the cap member 8, so when an unexpected collision occurs, the cap member 8 is less likely to move easily, and it has better performance and stable reliability.

Specifically, the cap member 8 is rotatably positioned in a first position or second position. When the cap member 8 is positioned in the first position, the resistance mechanism 7 provides a first resistance, and when the cap member 8 is positioned in the second position, the resistance mechanism 7 provides a second resistance which is different from the first resistance. As a result, the ability of anti-rotation of the chain guide 4 is adjustable according to various requirements.

In this embodiment, the cap member 8 is externally operable and covers the resistance mechanism 7, and the first resistance is greater than the second resistance. That is, the chain guide 4 is harder to rotate when the cap member 8 is in the first position than when the cap member 8 is in the second position, and thus it is suitable for riding on bumpy roads, and can effectively suppress the occurrence of chain throwing; in contrast, the chain guide 4 is easier to rotate when the cap member 8 is in the second position than when the cap member 8 is in the first position, an thus it is suitable for users to disassemble the rear wheel, mount the chain, adjust the speed shift, and operate other assembly and adjustment matters.

In this embodiment, the resistance mechanism 7 includes a ratchet member 71 and a pawl 72, the ratchet member 71 is rotatable with the axle assembly 5, and the pawl 72 is movably disposed on the movable member 3. When the cap member 8 rotates from the second position toward the first position, the cap member 8 drives the pawl 72 to engage with the ratchet member 71 so that the resistance mechanism 7 provides the first resistance to sufficiently prevent the reversing rotation and throwing of the chain guide 4 during riding on bumpy roads. When the cap member 8 rotates from the first position toward the second position (i.e., the cap member 8 is in the second position), the cap member 8 releases the pawl 72 so that the pawl 72 is disengageable from the ratchet member 71, where the chain guide 4 is movable with the resistance mechanism 7.

Preferably, the rear derailleur further includes a driven mechanism 9, and the cap member 8 is movable with the resistance mechanism 7 through the driven mechanism 9. Specifically, the driven mechanism 9 includes a pushing member 91 and an elastic member 92, the elastic member 92 is elastically abutted between the cap member 8 and the pushing member 91, and the cap member 8 is movable with the pushing member 91. When the cap member 8 rotates from the second position toward the first position, the cap member 8 drives the elastic member 92 to move the pushing member 91 to push the pawl 72 to engage with the ratchet member 71. When the cap member 8 rotates from the first position toward the second position, the elastic member 92 is not compressed, the ratchet member 71 can be released because the pawl 72 moves to disengage from the ratchet member 71 due to the gravity or because the ratchet member 71 is reversed to push the pawl 72 to retract the pushing member 91.

In this embodiment, the pushing member 91 is a sleeve, an end of the elastic member 92 is inserted in the pushing member 91, and another end of the elastic member 92 is inserted in a recess 81 of the cap member 8, so that the elastic member 92 is well limited and prevented from falling out.

The cap member 8 includes a seat 83 and a cap body 84, the seat 83 is detachably mounted to the movable member 3, and the seat 83 includes an operation space 831. The resistance mechanism 7 is received in the operation space 831, for blocking foreign matters (such as dust, small gravel, muddy, water or the like), thus ensuring that the resistance mechanism 7 can operate smoothly. The cap body 84 is rotatably connected to and covers the seat 83 and the operation space 831, thus sufficiently blocking foreign matters. The cap body 84 is rotatably positionable in the first position or in the second position. The elastic member 92 is elastically abutted between the cap body 84 and the pushing member 91.

Preferably, one of the seat 83 and the cap body 84 includes a first positioning unit 82, and the other of the seat 83 and the cap body 84 includes a second positioning unit 34 and a third positioning unit 35. When the cap member 8 is in the first position, the first positioning unit 82 and the second positioning unit 34 are engaged with each other so that the cap member 8 is positioned in the first position. Similarly, when the cap member 8 is in the second position, the first positioning unit 82 and the third positioning unit 35 are engaged with each other so that the cap member 8 is positioned in the second position.

In this embodiment, the cap member 8 includes the first positioning unit 82, the seat 83 includes the second positioning unit 34 and the third positioning unit 35, the first positioning unit 82 is an elastic member, and the second positioning unit 34 and the third positioning unit 35 are each a recess.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A rear derailleur, including:
    a base, configured to be mounted to a bicycle;
    a linkage assembly, connected to the base;
    a movable member, rotatably connected to the linkage assembly;
    a chain guide, rotatably connected to the movable member by an axle assembly;
    a biasing member, located between the movable member and the chain guide, positioned to the movable member and the chain guide;
    a resistance mechanism, connected to the movable member; and
    a cap member, covering the resistance mechanism and driving the resistance mechanism, rotatably positionable in either of a first position and a second position, wherein when the cap member is positioned in the first position, the resistance mechanism provides a first resistance, and when the cap member is positioned in the second position, the resistance mechanism provides a second resistance which is different from the first resistance.

2. The rear derailleur of claim 1, wherein the first resistance is greater than the second resistance.

3. The rear derailleur of claim 1, wherein the chain guide is rotatable with the axle assembly.

4. The rear derailleur of claim 1, wherein the resistance mechanism is disposed around the axle assembly.

5. The rear derailleur of claim 1, wherein the cap member is rotatable relative to the movable member.

6. The rear derailleur of claim 1, wherein when the cap member is in the second position, the chain guide is movable with the resistance mechanism.

7. The rear derailleur of claim 1, wherein the cap member is externally operable and covers the resistance mechanism, and the chain guide is harder to rotate when the cap member is in the first position than when the cap member is in the second position.

8. The rear derailleur of claim 1, wherein the cap member is externally operable and covers the resistance mechanism, and the chain guide is easier to rotate when the cap member is in the second position than when the cap member is in the first position.

9. The rear derailleur of claim 1, wherein the resistance mechanism includes a ratchet member and a pawl, the ratchet member is rotatable with the axle assembly, the pawl is movably disposed on the movable member, when the cap member rotates from the second position toward the first position, the cap member drives the pawl to engage with the ratchet member, and when the cap member rotates from the first position toward the second position, the cap member releases the pawl so that the pawl is disengageable from the ratchet member.

10. The rear derailleur of claim 9, wherein further including a driven mechanism, the driven mechanism includes a pushing member and an elastic member, and the elastic member is elastically abutted between the cap member and the pushing member; when the cap member rotates from the second position toward the first position, the cap member drives the pushing member to push the pawl to engage with the ratchet member.

\* \* \* \* \*